United States Patent [19]

Peterson

[11] Patent Number: 6,021,357

[45] Date of Patent: Feb. 1, 2000

[54] APPARATUS FOR SOLVING LADDER LOGIC

[75] Inventor: Clyde O. Peterson, Plum Borough, Pa.

[73] Assignee: Eaton Corporation, Cleveland, Ohio

[21] Appl. No.: 08/758,119

[22] Filed: Nov. 25, 1996

[51] Int. Cl.[7] .................................................. G05B 19/05
[52] U.S. Cl. ................................ 700/18; 700/12; 700/22; 700/295; 700/298
[58] Field of Search .................................... 364/147, 141, 364/528.3, 140.05; 700/12, 22, 295, 298, 18

[56] References Cited

U.S. PATENT DOCUMENTS

| | | | |
|---|---|---|---|
| 3,414,884 | 12/1968 | Jensen | 327/199 |
| 4,021,783 | 5/1977 | Highberger | 340/142.5 |
| 4,244,034 | 1/1981 | Cherba | 364/900 |
| 4,247,909 | 1/1981 | Bradley et al. | 364/900 |
| 4,623,961 | 11/1986 | Mackiewicz | 364/147 |
| 4,951,189 | 8/1990 | Onodera et al. | 364/141 |
| 5,005,152 | 4/1991 | Knutsen | 364/900 |
| 5,239,779 | 8/1993 | DeLand et al. | 49/360 |
| 5,684,470 | 11/1997 | DeLand et al. | 340/825.69 |
| 5,731,712 | 3/1998 | Welch | 364/41 |
| 5,777,869 | 7/1998 | Welch | 364/147 |

OTHER PUBLICATIONS

"Design Recovery for Relay Ladder Logic", Albert Falcione and Bruce H. Krogh, IEEE, p. 1, Jul. 1992.

"Worst–case Timing Prediction of Relay Ladder Logic by Constraint Analysis", Kyeonghoon Koo and Wook Hyun Kwon, IEEE, p. 1, Apr. 1996.

"Energy Recovery Circuits Using Reversible and Partially Reversible Logic", Yibin Ye and Kaushik Roy, IEEE, p. 769–777, Sep. 1996.

Primary Examiner—Paul P. Gordon
Assistant Examiner—Iván Calcaño
Attorney, Agent, or Firm—Martin J. Moran

[57] ABSTRACT

A logic controller apparatus for solving ladder logic includes first memory locations for storing representations of the ladder logic and second memory locations for storing a plurality of input and output digital logic signals. A processor employs at least some of the digital logic signals for solving the representations of the ladder logic. A representation of ladder logic power flowing from a power rail to a neutral rail flows in a forward direction from a first port to a second port of at least one of a plurality of ladder functional devices, such as contacts. The contacts are organized in a plurality of rows which include at least one of the contacts. The ladder logic power representation also flows in a reverse direction from the second port to the first port of at least another one of the functional devices.

18 Claims, 6 Drawing Sheets

APPARATUS FOR SOLVING LADDER LOGIC

BACKGROUND OF THE INVENTION

1. Field of the Invention

This invention relates to an apparatus for solving logic and, more particularly, to a logic controller apparatus for solving programmable controller ladder logic.

2. Background Information

Programmable logic controllers (PLC's) are well-known in the art. Programmable logic controllers are utilized to solve ladder logic which is represented by a power rail, a plurality of inputs or functional devices or contacts, a plurality of outputs or results devices or coils, and a neutral rail. The ladder logic includes a plurality of individual ladder diagrams, segments or rungs.

Each ladder diagram includes one or more dual-ported functional devices, each having a left port and a right port, and one or more dual-ported results devices. The functional devices and results devices are interconnected in a series and/or parallel fashion between the power and neutral rails. The left port of at least one of the functional devices is connected to the power rail, the right port of the results devices is connected to the neutral rail, and the right port of at least one of the functional devices is connected to the left port of the results devices. In this manner, the ladder logic emulates hardwired relay logic in which relay contacts and relay coils are hardwire-connected between the rails of a power source.

In the ladder logic, the contacts are typically organized in a plurality of rows and columns. For example, a plurality of contacts may be connected in series in one of the rows and a plurality of contacts may be connected in parallel in one of the columns. The open or closed state of the contacts in combination with the ladder logic of the ladder segment defines whether power flows from the power rail, through one or more of the contacts, and through the results device to the neutral rail, thereby energizing the results device.

It is known to solve ladder logic on a column by column basis. For example, in a ladder segment having plural columns and plural rows, the power flow through the first column is determined for each of the rows on the basis of the presence or absence of a contact in each of the rows, the closed or open state of the contacts, and the presence or absence of a parallel connection between adjacent rows. After power flow through the first column is determined, the power flow through the other columns is sequentially determined for the second column through the last column. Finally, the energized or non-energized state of the results devices is determined on the basis of the power flowing thereto out of the last column of the contacts.

It is also known to solve ladder logic when power flow is only positive or forward (e.g., generally from the left port to the right port of a closed contact) without allowing for solution when power must flow in the negative or reverse direction (e.g., generally from the right port to the left port of a closed contact). In this regard, it is known to solve ladder logic in a PLC for forward power flow but not reverse power flow.

Although these known methods provide the solution of power flow from the power rail through the contacts to the results device, there is room for improvement.

SUMMARY OF THE INVENTION

The present invention provides the solution of ladder logic power flow independent of power flow direction. A logic controller apparatus for solving ladder logic includes means for storing representations of the ladder logic; means for storing a plurality of digital logic signals; and means employing at least some of the digital logic signals for solving the representations of the ladder logic. A representation of power from a power rail to a neutral rail flows from a first port to a second port of at least one of a plurality of devices organized in a plurality of rows which include at least one of the devices. The representation of the power flows from the second port to the first port of at least another one of the devices.

As another aspect of the invention, a logic controller apparatus for solving ladder logic includes means for storing representations of the ladder logic; means for storing a plurality of digital logic signals; and means employing at least some of the digital logic signals for solving the representations of the ladder logic. A representation of power from a power rail to a neutral rail flows from the first port to the second port of one of a plurality of devices in a first state of the at least some of the digital logic signals. A representation of the power flows from the second port to the first port of the one of the devices in a second state of the at least some of the digital logic signals.

As a further aspect of the invention, an apparatus for solving ladder logic includes input means for inputting first digital logic signals; output means for outputting second digital logic signals; means for storing the first and second digital logic signals; means for storing representations of the ladder logic; and processor means including means for moving the first digital logic signals from the input means to the means for storing the first and second digital logic signals, means for moving the second digital logic signals from the means for storing the first and second digital logic signals to the output means, and means employing at least some of the first and second digital logic signals for solving the representations of the ladder logic. A representation of power from a first power rail to a second power rail flows from the first port to the second port of at least one of a plurality of devices organized in a plurality of rows which include at least one of the devices. The representation of the power flows from the second port to the first port of at least another one of the devices.

As another aspect of the invention, an apparatus for solving ladder logic includes means for storing a representation of the ladder logic; means for determining each of a plurality of functional devices having an on state in which ports thereof are logically connected, and alternatively having an off state in which the ports thereof are logically disconnected; means for determining a list of some of a plurality of independent nodes which are logically interconnected with a first power rail by some of the functional devices having the on state; and means for determining the on state of a results device, in which power flows from the first port to the second port thereof, in the event that the first port of the results device is logically connected with an Mth node by at least one of the functional devices having the on state and for determining the off state, in which no power flows from the first port to the second port, of the results device otherwise. A first node of the some of the nodes is logically connected with the first power rail by at least one of the functional devices having the on state. A second node of the some of the nodes is logically connected with the first node by at least another one of the functional devices having the on state. An Nth node of the some of the nodes is logically connected with the Mth node of the some of the nodes by at least another one of the functional devices having the on state. The Nth node is logically interconnected with the first power rail by at least some of the some of the functional devices having the on state. The first port of at least one of the functional devices is connected to the first power rail and the second port of the results device is connected to the second power rail. The functional devices are interconnected between the first power rail and the first port of the results device. The interconnection of the first power rail, the ports of the functional devices, and the first port of the results device defines the nodes. At least some of the ports of the functional devices are connected to one of the nodes and the first port of the results device is connected to one of the nodes. The on state of the functional devices logically connect a pair of the nodes.

DESCRIPTION OF THE PREFERRED EMBODIMENT

Figure 1:
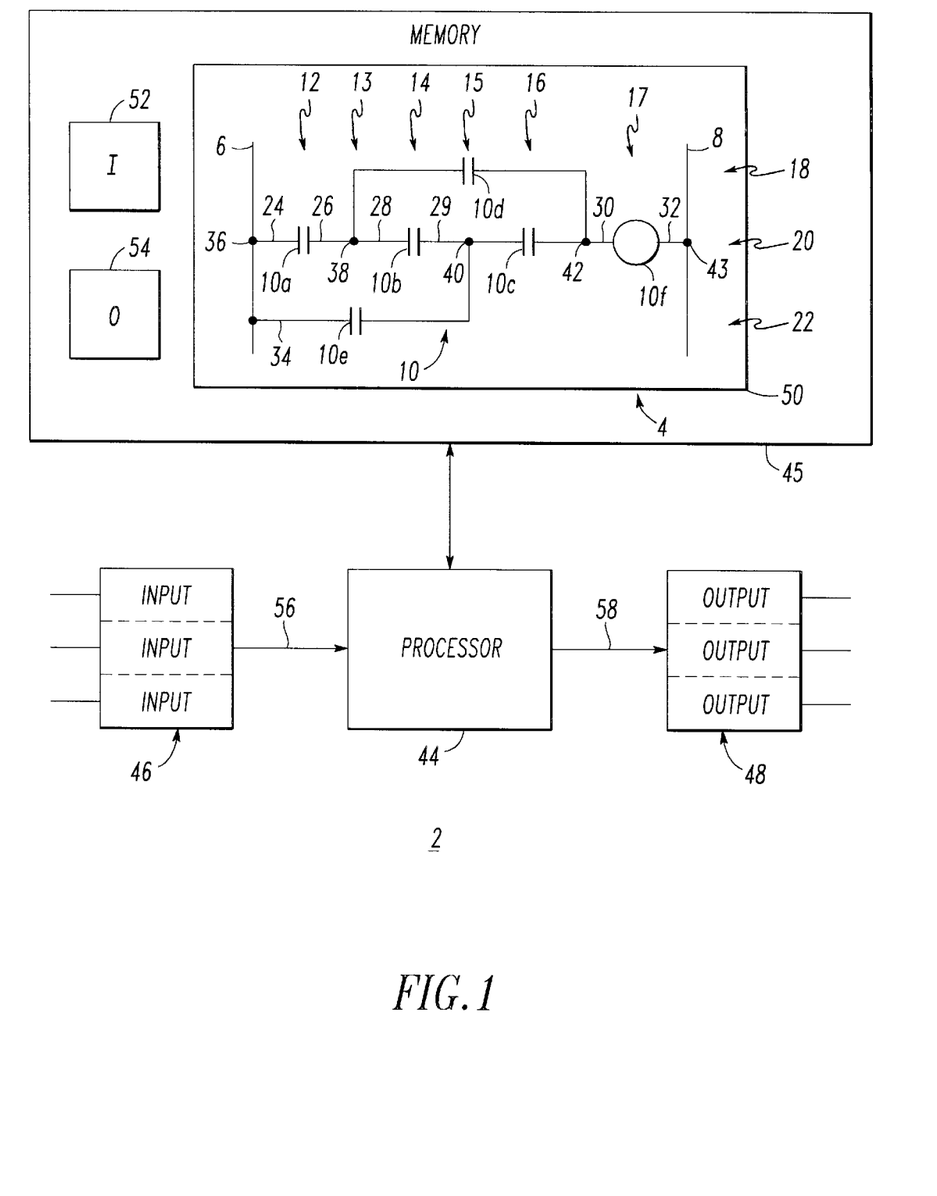
FIG. 1 is a block diagram of an apparatus for solving ladder logic in accordance with the invention.

Referring to FIG. 1, a logic controller apparatus 2 for solving ladder logic 4 is illustrated. The ladder logic 4 includes a pair of power rails, such as power rail 6 and neutral rail 8, and plural devices 10 between such rails 6,8. The devices 10 include functional devices or contacts 10a, 10b, 10c, 10d, 10e, and a results device or coil 10f. The devices 10 are organized in exemplary columns 12,13,14, 15,16,17 and exemplary rows 18,20,22 each of which typically includes at least one of the devices 10. The devices 10 have two ports, such as first port 24 and second port 26 of contact 10a. The first port 24 of contact 10a is connected to the power rail 6 and the second port 26 of contact 10a is connected to the first port 28 of contact 10b (and to the first port of contact 10d). Similarly, the coil 10f has an input port 30 and an output port 32 which is connected to the neutral rail 8.

Functional devices, such as the exemplary contact 10a, have an on state in which the ports 24,26 thereof are logically connected, and alternatively have an off state in which such ports 24,26 are logically disconnected. The coil 10f has an on state in which power flows from the port 30 to the port 32 thereof, and alternatively has an off state in which no power flows from the port 30 to the port 32. The first ports 24,34 of the respective exemplary contacts 10a, 10e are connected to the power rail 6, although one, three or more first ports may be so connected.

The functional devices 10a–10e are interconnected between the power rail 6 and the port 30 of the coil 10f. The interconnection of the power rail 6, the ports of the functional devices 10a–10e, and the ports 30,32 of the coil 10f defines a plurality of independent nodes 36,38,40,42,43. Each of the ports of the functional devices 10a–10e and the port 30 of the coil 10f are connected to one of the nodes 36,38,40,42. For example, node 36 is connected to power rail 6, port 24 of contact 10a, and port 34 of contact 10e. In the case of the on state of one of the functional devices 10a–10e, a pair of the nodes 36,38,40,42 is logically connected. The nodes 36,38, for example, are logically connected during the on state of contact 10a.

The logic controller apparatus 2 includes a processor 44, a memory 45, one or more inputs 46, and one or more outputs 48. The memory 45 includes memory locations 50, 52 (I) and 54 (O) for respectively storing representations of the ladder logic 4, one or more input digital logic signals 56 input by the inputs 46, and one or more output digital logic signals 58 output by the outputs 48. As explained in greater detail below in connection with FIGS. 3A–3B and 4–5, the processor 44 employs at least some of the digital logic signals 56,58 for solving the representations of the ladder logic 4.

Figure 2:
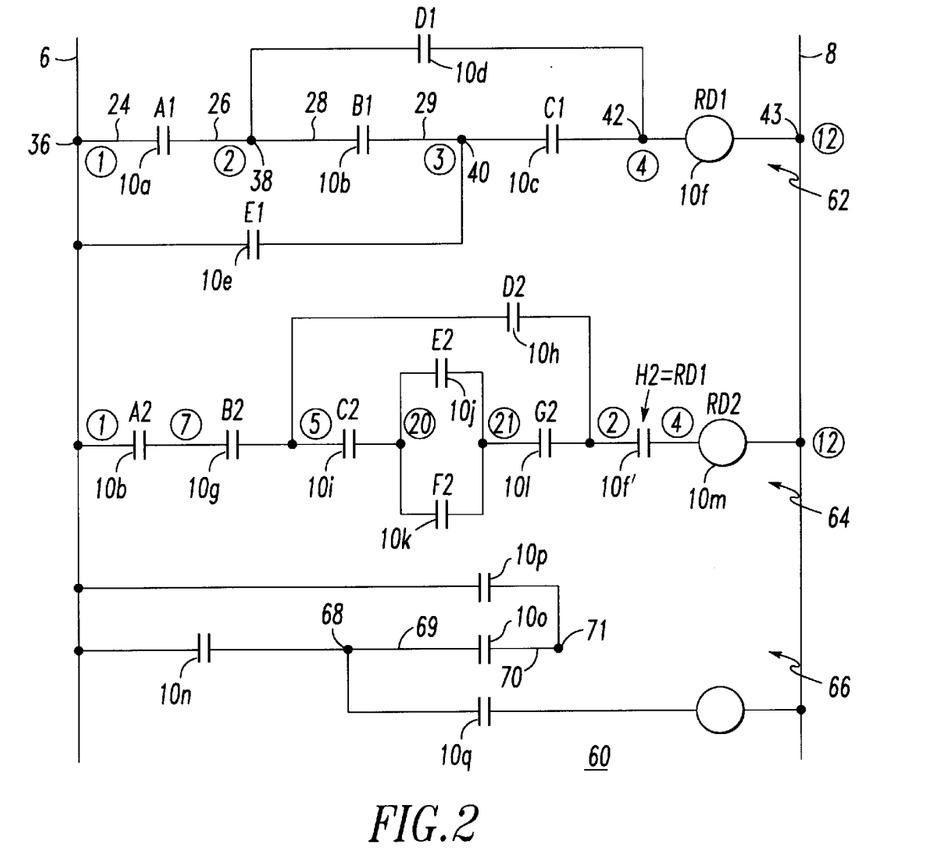
FIG. 2 is a diagram of ladder logic for solution by the apparatus of FIG. 1.

Referring to FIG. 2, an exemplary ladder diagram 60 of multi-dimensional ladder rungs 62,64,66 is illustrated. Each of the rungs 62,64,66 has one or more rows and plural columns for solution by the apparatus 2 of FIG. 1. The exemplary upper rung 62 of FIG. 2 is represented by the ladder logic 4 of FIG. 1. Each of the rungs 62,64,66 is a single ladder logic segment which, as shown in rung 62, has plural functional devices 10a–10e and one results device 10f. Similarly, the exemplary middle rung 64 has plural functional devices 10b, 10f', 10g, 10h, 10i, 10j, 10k, 10l and one results device 10m. As shown in rungs 62,64, one or more of the contacts, such as contact 10b, may be employed by one or more of the rungs 62,64. Also, the logical state of the coil 10f (labeled RD1) of rung 62 may be employed as a contact 10f' (labeled H2=RD1) in rung 64.

An important aspect of the present invention is the capability of the apparatus 2 of FIG. 1 to solve (i.e., resolve) ladder rungs having "reverse power flow" through one or more of the functional devices, such as contact 10b of FIG. 2, in which power may flow from the second port 29 to the first port 28 thereof. In rung 62, for example, it is possible that a representation of power from the power rail 6 to the neutral rail 8 flows, in at least one of the functional devices, such as contact 10a, from the first port 24 to the second port 26. This occurs whenever contact 10a is closed (e.g., on or true). Furthermore, it is also possible that a representation of (reverse) power flows from the second port 29 to the first port 28 of at least another one of the functional devices, such as contact 10b. This occurs whenever contacts 10b, 10e are closed, and contact 10a is open (e.g., off or false).

Reverse power flow is possible in various rung configurations. For example, reverse power may flow in contact 10b of rung 62 which is configured with: (1) contact 10a; (2) contact 10e connected at node 40 to; (3) port 29 of contact 10b, with contact 10a connected to the other port 28 of contact 10b at node 38; and (4) contact 10d connected to node 38. Both forward power flow and reverse power flow are possible in contact 10b of rung 62.

Figure 6:
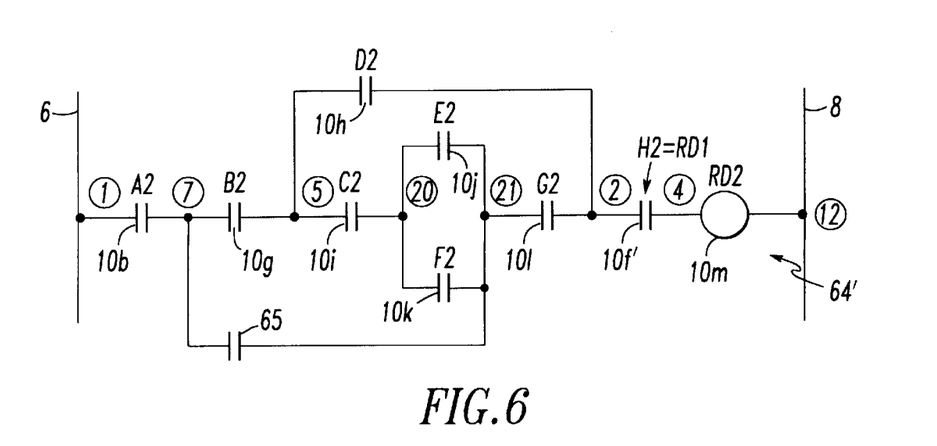
FIG. 6 is another diagram of ladder logic for solution by the apparatus of FIG. 1.

Although forward power flow is possible, reverse power flow is not possible in rung 64. It will be appreciated that reverse power flow is possible by modifying middle rung 64, for example, to form rung 64' of FIG. 6 in which contact 65 connected between circled node 7 and circled node 21. In certain cases, either forward or reverse power may flow in contacts 10i and 10j or 10k.

In the exemplary lower rung 66 of FIG. 2, another non-limiting example of forward power flow is illustrated. A representation of (forward) power flows from the second port 70 to the first port 69 of contact 10o whenever contacts 10p, 10o are closed, and contact 10n is open. Rung 66 is configured as follows: (1) contact 10p; (2) contact 10n is connected at node 68 to; (3) port 69 of contact 10o, with contact 10p connected to the other port 70 of contact 10o at node 71; and (4) contact 10q is connected to node 68. Reverse power flow is not possible in contact 10o of rung 66.

It will be appreciated that rung 66 may be redrawn to shown, more clearly, that the series combination of contacts 10p and 10o are in parallel with contact 10n. In that case, which is electrically equivalent to rung 66 of FIG. 2, forward power flows from (now left) port 70 to (now right) port 69 of contact 10o whenever contacts 10p, 10o are closed.

The resolution of the rungs may be understood in terms of physical relay contacts. For example in lower rung 66, as shown in FIG. 2, when contacts 10p, 10o and 10q are closed, and contact ion is open, there is a relatively small positive voltage drop from port 70 to port 69 of contact 10o. This voltage drop causes electrons to flow into port 70 and out of port 69 of closed contact 10o. If this direction of electron flow is arbitrarily defined as "forward electron flow" (FEF), then the direction of power flow across the relatively small voltage drop is defined as forward power flow (FPF). With the particular contact states in this exemplary configuration, there is no positive voltage drop from port 69 to port 70, no electron flow into port 69 and out of port 70, no negative FPF and, hence, no reverse power flow (RPF). In this regard, the terms "forward" and "reverse" are purely exemplary. Once the contacts are hard-wired into (or interconnected within) a particular rung, they remain so wired (interconnected) for the purpose of the above discussion. Furthermore, all designations of contact ports, nodes and names are arbitrarily selected, but once selected, they remain so selected for the purpose of the discussion.

An important aspect of the present invention is the capability of the apparatus 2 of FIG. 1 to resolve ladder logic with power flow in either direction across any particular closed contact. Although power flow is in only one direction through (across) a particular contact for any given rung configuration of open and closed contacts, if there is a logic configuration of the multiple contacts of the rung which causes power flow in one direction through (across) such particular contact, and if there is another logic configuration of the multiple contacts of the rung which causes power flow in the opposite direction through (across) the same contact, then the apparatus 2 still resolves the logic independent of power flow direction through (across) the particular contact.

In upper rung 62 of FIG. 2, when contacts 10a, 10b and 10c are the only closed contacts in such rung, there is a relatively small voltage drop across contact 10b which causes electrons to flow into port 28 and out of port 29 of contact 10b. On the other hand, when contacts 10e, 10b and 10d are the only closed contacts in rung 62, there is a relatively small opposite voltage drop across contact 10b which causes electrons to flow into port 29 and out of port 28. Either direction may be selected for FPF. Once FPF is selected, then the opposite direction is designated for RPF. The apparatus 2 resolves both possible forward power flow and reverse power flow configurations of the rung 62.

Figure 3A:
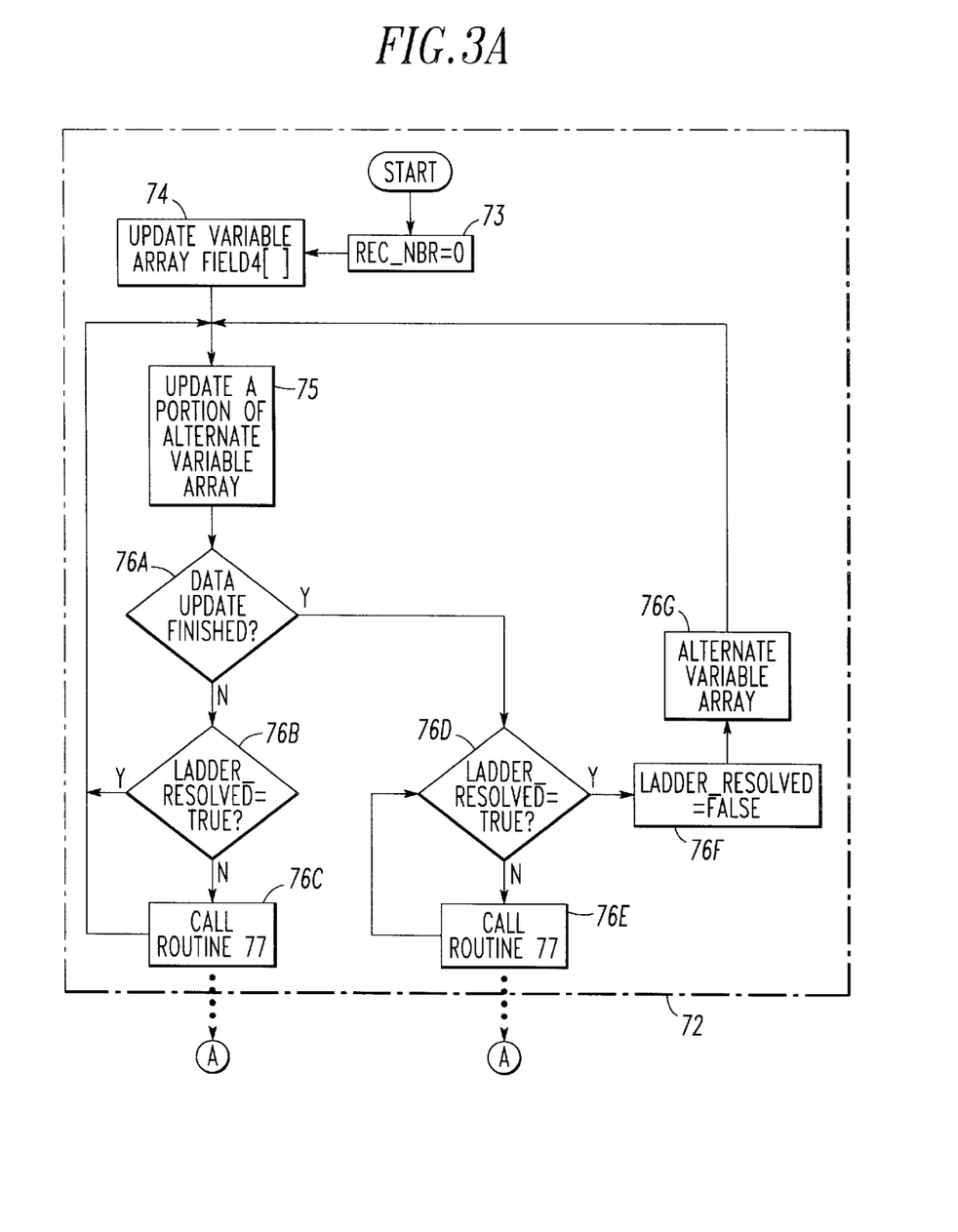
FIGS. 3A–3B, 4, and 5 flowcharts of software routines for execution by the processor of FIG. 1 in solving ladder logic in accordance with the invention.

Referring to FIG. 3A, a flowchart of a main software routine 72 for the processor 44 of FIG. 1 is illustrated. After starting, at step 73, variable rec_nbr is set to zero. Next, step 74 provides an input scan and an output scan. The input scan moves plural digital logic signals 56 from the inputs 46 to the memory locations 52 of the memory 45 of FIG. 1. The output scan moves plural digital logic signals 58 from the memory locations 54 of the memory 45 to the outputs 48. In this manner, step 74 updates a variable array Field4[ ] with the status of the FD elements from the inputs 46 and, also, updates the outputs 48 with the status of the RD elements from the variable array Field4[ ].

Next, step 75 updates a portion of an alternate variable array (e.g., a parallel variable array Field4[ ]). As a non-limiting example, in one execution of step 75, the input scan moves plural digital logic signals 56 from the inputs 46 to the memory locations 52 of the memory 45 of FIG. 1. In other executions of step 75, the output scan moves one (e.g., for the RD of one rung) of the digital logic signals 58 from the memory locations 54 of the memory 45 to one of the outputs 48 for each of such executions. In still other executions of step 75, and in step 74, other types of outputs and inputs (e.g., outputs to or inputs from a communications network) may be scanned. In this manner, plural executions of step 75 update the parallel variable array with the status of FD elements from various input sources and, also, update the various output destinations with the status of RD elements from the parallel variable array.

Then, at step 76A, if the entire alternate variable array of step 75 is updated, execution resumes at step 76D. Otherwise, at step 76B, a variable ladder_resolved (FIG. 3B) is tested. If variable ladder_resolved is true, then step 75 is repeated. Otherwise, at step 76C, a routine 77 is called and, then, step 75 is repeated. In the preferred embodiment, the routines 72,77 are run sequentially as a single thread, although the invention is applicable to routines which run as two parallel tasks. The routines 72,77 employ at least some of the digital logic signals 56,58 for solving the representations of the ladder logic 4 of FIG. 1, such as the multi-dimensional ladder rungs 62,64,66 of FIG. 2, some of which may include reverse power flow.

At step 76D, the variable ladder_resolved (FIG. 3B) is tested. If true, then step 76F is executed. Otherwise, at step 76E, routine 77 is called and, then, step 76D is repeated.

Step 76F sets the variable ladder_resolved false. Next, at step 76G, the variable array is alternated (e.g., from array Field4[ ] to array Field4[ ], or from array Field4[ ] to array Field4[ ]). Then, step 75 is repeated.

As discussed below in connection with Table I, the processor 44 employs various arrays in the memory locations 50 of FIG. 1. These arrays include a definition of the ladder segments or rungs to be resolved, such as rungs 62,64,66 of FIG. 2. Each ladder rung is assigned a number and each node of a particular ladder rung is assigned a unique number within such segment. For every ladder rung, the power rail node 36 is assigned the exemplary number one and the neutral rail node 43 is assigned the exemplary number twelve, although a wide range of numbers are possible. The node numbers of one ladder rung may be reused as node numbers of any other ladder rung.

The three fixed arrays of Table I include: (1) array Field1[ ] of functional device (FD) or results device (RD) left side node numbers; (2) array Field2[ ] of FD or RD right side node numbers; and (3) array Field3[ ] of segment numbers. One variable array (not shown in Table I) is the array Field4[ ] of the status of the FD and RD elements. This variable array, which is stored in memory locations 52,54 of FIG. 1, includes status values of either 0 or 1, for open or closed, respectively.

The indices of the three fixed arrays include the numbers 0,1,2, . . . N, where N is the count less one of the number of FD's and RD's in the ladder rungs. A particular index number refers to one and only one device (i.e., FD or RD), although multiple uses of the same digital logic signals 56,58 are possible (e.g., B1 of rung 62 and A2 of rung 64, RD1 of rung 62 and H2=RD1 of rung 64).

The three exemplary arrays Field1[ ], Field2[ ] and Field3[ ] of the rungs 62,64 of FIG. 2 are shown in Table I. The array element Field1[2], for example, is the left side node number (i.e., three) of device number two (i.e., contact 10c, labeled C1) and the array element Field3[2] is the segment (i.e., segment one or rung 62) in which device number two is found. For convenience of reference, the node numbers of arrays Field1[ ], Field2[ ] are shown (circled) in rungs 62,64.

TABLE I

| Index | Field1[ ] | Field2[ ] | Field3[ ] | FD/RD |
|---|---|---|---|---|
| 0 | 1 | 2 | 1 | A1 |
| 1 | 2 | 3 | 1 | B1 |
| 2 | 3 | 4 | 1 | C1 |
| 3 | 2 | 4 | 1 | D1 |
| 4 | 1 | 3 | 1 | E1 |
| 5 | 4 | 12 | 1 | RD1 |
| 6 | 1 | 7 | 2 | A2 |
| 7 | 7 | 5 | 2 | B2 |
| 8 | 5 | 20 | 2 | C2 |
| 9 | 5 | 2 | 2 | D2 |
| 10 | 20 | 21 | 2 | E2 |
| 11 | 20 | 21 | 2 | F2 |
| 12 | 21 | 2 | 2 | G2 |
| 13 | 2 | 4 | 2 | H2 |
| 14 | 4 | 12 | 2 | RD2 |

The ordering of the nodes of the FD elements in a particular ladder rung is not significant. In the exemplary embodiment, as shown in Table I, the ordering of the RD's (i.e., RD1, RD2) have the highest index number of any element in the corresponding ladder rungs 62,64. For example, as shown in Table I, segment one (i.e., rung 62) has an index number five for RD1 and segment two (i.e., rung 64) has an index number fourteen for RD2. The other elements of the corresponding rungs have lower index numbers for the FD elements (i.e., A1–E1 and A2–H2).

A running counter (e.g., rec_nbr) contains the index (shown in the first column of Table I, above) and points to the first element of the single rung to be resolved. In this manner, rung 62 is resolved first and the counter is left with the first element of rung 64 which is resolved second. Any subsequent rungs (not shown in Table I), such as rung 66, are resolved thereafter. The status of the FD's of rungs 62,64 is determined from the memory 45. Preferably, as discussed in greater detail below in connection with FIG. 5, in order to enhance the speed of execution, only the FD's having the closed state are considered.

Figure 3B:
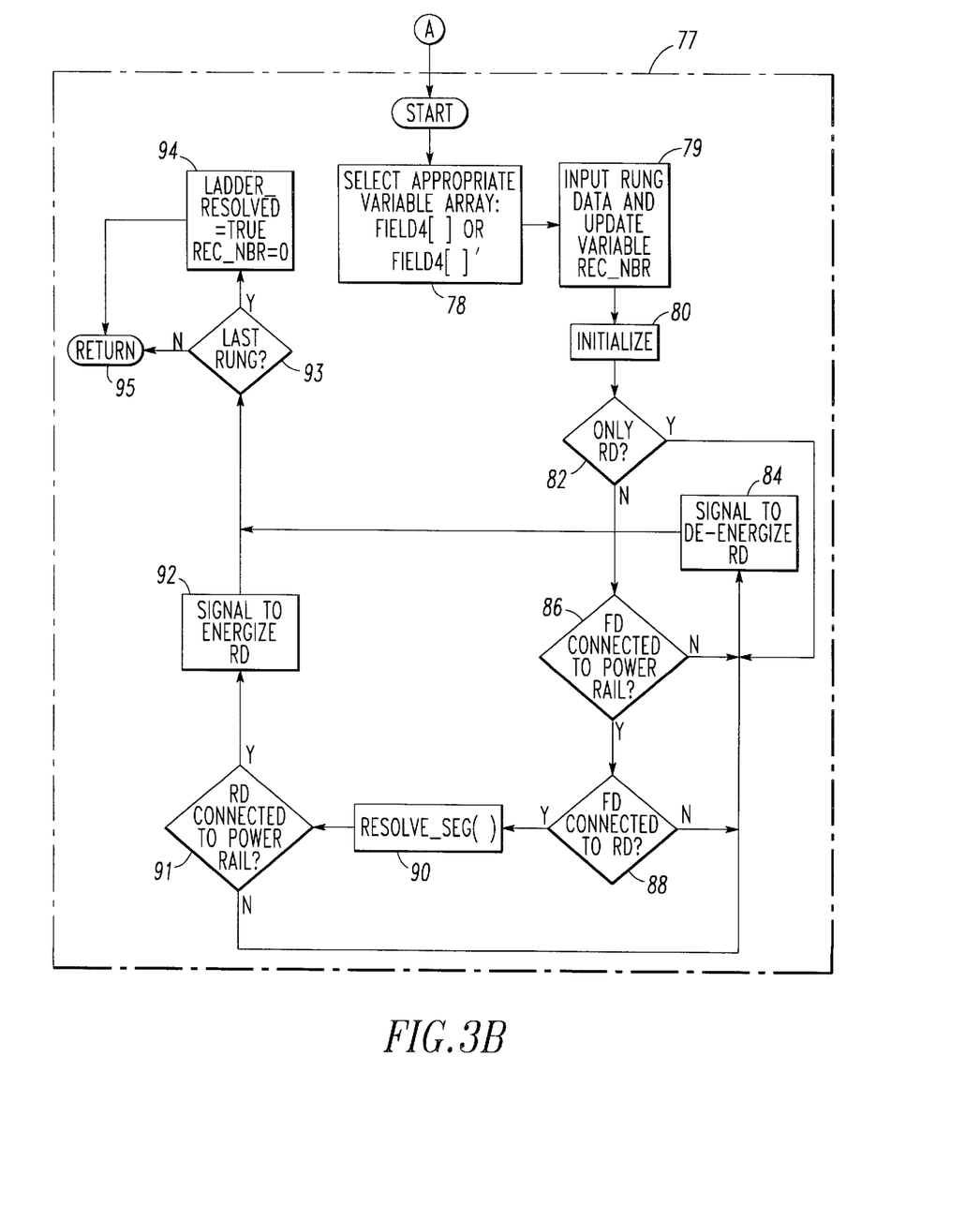

Referring to FIGS. 3A–3B, after the exemplary routine 77 is called at either of steps 76C, 76E by the main routine 72, at step 78, the appropriate one of the parallel variable arrays Field4[ ], Field4[ ]' is selected. For the initial execution of the complete resolution of a ladder diagram utilizing routine 77, the variable array Field4[ ] is chosen and, thereafter, the arrays are alternated (e.g., Field4[ ]', Field4[ ], Field4[ ]', etc.) on subsequent executions of the complete resolution of such ladder diagram utilizing routine 77. Next, at step 79, the status of the FD and RD elements of the first ladder rung (e.g., rung 62 of FIG. 2) is input from the selected one of the variable arrays Field4[ ], Field4[ ]'. Step 79 also updates the counter rec_nbr with the index which points to the first element of the next rung to be resolved on the subsequent execution of routine 77. At step 80, several lists, arrays and variables are initialized for one of the rungs to be resolved. The lists include linked lists LL0[ ] and LL1[ ]. For convenience of reference and comparison, Table II includes such lists for both of the rungs 62,64 of FIG. 2. For purpose of illustration, in the example of Table II, the exemplary FD's having closed states are, for rung 62, B1, D1 and E1 (i.e., indices 1, 3 and 4 of Table I) and, for rung 64, A2, B2, C2, G2 and H2 (i.e., indices 6, 7, 8, 12 and 13 of Table I).

Linked lists LL0[ ] and LL1[ ] are pointers into an array valid_recs[ ] (shown in Table III, below) and, hence, the list elements of linked lists LL0[ ] and LL1[ ] are indices of array valid_recs[ ]. The elements of array valid_recs[ ] are indices of closed FD's and the RD of the particular rung to be resolved as obtained from Table I.

TABLE II

| Index | Rung 62 LL0[ ] | Rung 62 LL1[ ] | Rung 64 LL0[ ] | Rung 64 LL1[ ] |
|---|---|---|---|---|
| 0 | 0 | 1 | 0 | 1 |
| 1 | 1 | 2 | 1 | 2 |
| 2 | 2 | 3 | 2 | 3 |
| 3 | 3 | −1 | 3 | 4 |
| 4 |   |   | 4 | 5 |
| 5 |   |   | 5 | −1 |

The meaning of reading down the list elements of linked lists LL0[ ] and LL1[ ] for rung 62 will be understood from the following:
(1) element 0 of array valid_recs[ ] as read from LL0[ ] is linked to element 1 of array valid_recs[ ] as read from LL1[ ];
(2) element 1 of array valid_recs[ ] as read from LL0[ ] is linked to element 2 of array valid_recs[ ] as read from LL1[ ];
(3) element 2 of array valid_recs[ ] as read from LL0[ ] is linked to element 3 of array valid_recs[ ] as read from LL1[ ]; and
(4) element 3 of array valid_recs[ ] as read from LL0[ ] is linked to the RD node (i.e., through −1 at index three in LL1[ ]).

As shown in Table III, step 80 of FIG. 3B also initializes array valid_recs[ ] for one of the rungs 62,64 of FIG. 2 to be resolved.

TABLE III

| Index | Rung 62 valid_recs[ ] | Rung 64 valid_recs[ ] |
|---|---|---|
| 0 | 1 | 6 |
| 1 | 3 | 7 |
| 2 | 4 | 8 |
| 3 | 5 | 12 |
| 4 |   | 13 |
| 5 |   | 14 |

Step 80 further initializes two pointer variables, flnk and llnk. For rung 62, pointer flnk is the memory address of list element LL0[0] and pointer llnk is the memory address of list element LL0[3]. In a similar manner, in rung 64, pointer flnk is the memory address of element LL0[0] and pointer llnk is the memory address of element LL0[5]. Finally, step 80 saves the left node number of the RD element in variable rd_node, and the record number of the RD element in variable rd_rec. For example, as seen from Table I, in rungs 62,64 of FIG. 2, variable rd_node=4; in rung 62, variable rd_rec=5; and in rung 64, variable rd_rec=14.

Next, at step 82, a test checks for the existence of only the RD element in the rung (i.e., if pointer llnk=the memory address of LL0[0] or, in other words, if there is only one element in array valid_recs[ ]). If true, resolution is complete, the RD element is to be de-energized, and a corresponding signal is cleared at step 84. On the other hand, if the rung includes FD elements, resolution is not complete and the existence of an FD element connected to the power rail 6 is tested at step 86 (i.e., by testing each FD of array valid_recs[ ] for the presence of a node (=one) which is connected to the power rail 6 of FIG. 2) and, then, the existence of an FD element connected to the RD element is tested at step 88 (i.e., by testing each FD of array valid_recs[ ] for the existence of a node (=rd_node) which is connected to the first port 30 of the RD). The exemplary tests 86,88 are employed because open FD elements are excluded from the exemplary array valid_recs[ ] of Table III. If either of these tests 86,88 fail, then resolution is complete, and the RD element is to be de-energized through step 84. On the other hand, if both tests 86,88 pass, then resolution of the rung is provided by "collapse of power rail" (CPR) as discussed below in connection with FIGS. 4–5 with function Resolve_Seg( ) 90.

After the function Resolve_Seg( ) 90, step 91 determines whether a global variable k (discussed below in connection with FIGS. 4–5) is set. If so, the RD is interconnected with power rail 6 of FIG. 2, and, at step 92, the RD element is to be energized by storing a logical one (1) in the corresponding element of the selected one of the variable arrays Field4[ ],Field4[ ]'. On the other hand, if variable k is 0, then, at step 84, the RD element is to be de-energized by storing a logical zero (0) in the corresponding element of the selected one of the variable arrays Field4[ ],Field4[ ]'. After either steps 84 or 92, at step 93, the existence of a subsequent rung is determined (e.g., if variable rec_nbr is less than N, which is the maximum index for Table I). If there are additional rungs, then the routine 77 returns at step 95. Otherwise, if there are no further rungs to be resolved, at step 94, the variable ladder_resolved is set true and the variable rec_nbr is set to zero before returning at step 95.

Figure 4:
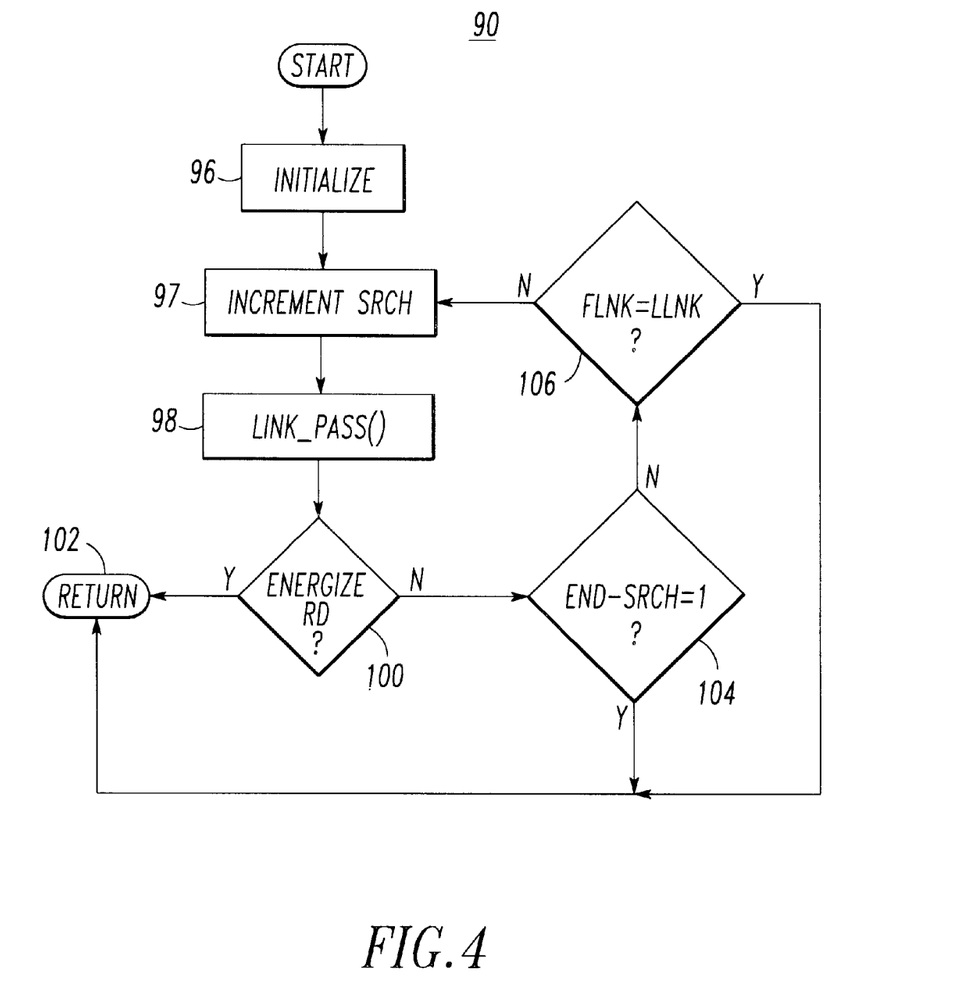

FIG. 4 illustrates function 90. The initialization step 96 includes setting index variable srch=−1 and index variable end=1. The variables srch and end are indices of an array power_rail[ ]. Step 90 also initializes array element power_rail[0]=1, which corresponds to the exemplary power rail 6 of the rungs 62,64,66.

During the execution of function 90, in rung 62 of FIG. 2, for example, the power rail 6 (which has the node value of one as shown in Table I; column Field1[ ]; indices 0,4,6) is collapsed from the first node 36 to the second node 38, by entering the number two (i.e., the right node number of the FD at index 0, as shown in Table I; column Field2[ ]; index 0, which is the exemplary second node 38 of FIG. 2) into an element of array power_rail[ ] which has its index equal to index variable end. Then, index variable end is incremented by one in order to point to the next empty element of array power_rail[ ]. The exemplary elements of array power_rail[ ] are unique (i.e., no two elements have equal values). This is accomplished by comparing the contents of each element of array power_rail[ ] with a candidate node for possible entry into such array. If the candidate node already exists in array power_rail[ ], then it is not re-entered a second time. In this manner, the size of array power_rail[ ] is managed which speeds resolution of the rung.

Following initialization, a loop is entered at steps 97,98, 100,104,106. First, index variable srch is incremented at step 97. Then, reference is made to the function Link_Pass( ) 98 which returns global variable k which is tested at step 100. If variable k is 1, then the RD element is to be energized through steps 91–92 of FIG. 3B, and function 90 is exited at step 102. Otherwise, if variable k is 0, then, at step 104, a test is made to determine whether the difference between index variables end and srch is 1. If so, rung resolution is complete and the RD element is to be de-energized through steps 91,84 of FIG. 3B, and the function 90 is exited at step 102. On the other hand, if such difference is not 1, then, at step 106, a test is made for the equality of variables fink and llnk. If equal, rung resolution is complete and the RD element is to be de-energized through steps 91,84 of FIG. 3B, as discussed above. Otherwise, index variable srch is incremented at step 97 and the loop is repeated.

Figure 5:
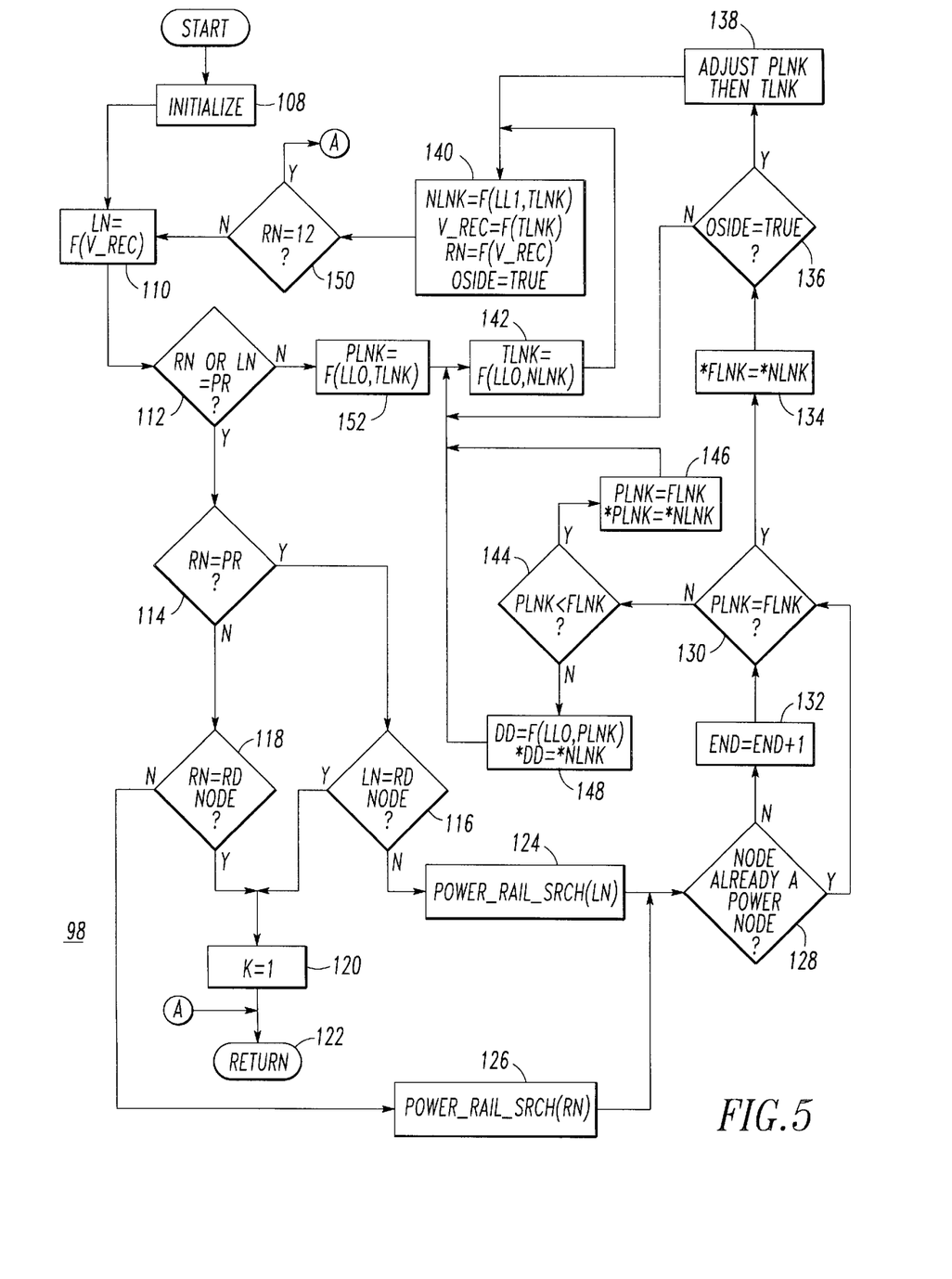

Referring to FIG. 5, the function 98 is illustrated. At step 108, initialization is conducted as follows: (1) variable k=0; (2) variable pr=power_rail[srch]; (3) variable plnk=flnk; (4) variable tlnk=&LL0[*flnk]; (5) variable v_rec=valid_recs [*flnk]; (6) variable rn (i.e., right node of functional device)=Field2[v_rec]; (7) variable nlnk=&LL1[*tlnk]; and (8) logical variable oside=false. The variables flnk, llnk, plnk, tlnk and nlnk are pointers to variables (i. e., they contain the address of a variable). A particular value is stored at the address pointed to by these variables. The value *flnk, for example, is the value pointed to by the variable flnk (e.g., if flnk points to address 80H and the contents of memory address 80H is one, then *flnk=one). As a further example, if *flnk is one, then variable tlnk is the pointer to the memory address of element LL0[*flnk] or the pointer to the memory address of element LL0[1]. Next, at step 110, variable ln (i.e., left node of functional device) as obtained from Field1[ ] of Table I is set as a function of variable v_rec (i.e., variable ln=Field1[v_rec]).

At step 112, if either of variables rn or ln is equal to variable pr (i.e., power rail), then, at step 114, variable rn is compared to variable pr. If such variables are equal, then, at step 116, variable ln is compared to variable RD node (i.e., 4 in the exemplary embodiment as shown in Table I; column Field1[ ]; index 5). Otherwise, at step 118, variable rn is compared to variable RD node. If either of the tests of steps 118 or 120 are met, then variable k is set to 1 at step 120, and function 98 returns with this result at step 122. If test 116 is not met, then, at step 124, the function power_rail_srch( ) including variable ln is executed. In function power_rail_srch( ), at step 124, each element of array power_rail[ ] is evaluated to determine whether it equals the FD's left node as contained in variable ln. If not, then the element power_rail[end] is set equal to variable ln and a false signal is returned for testing at step 128. Otherwise, a true signal is returned for testing. Similarly, if test 118 is not met, at step 126, function power_rail_srch( ) including variable rn is executed. Adding nodes to array power_rail[ ] is equivalent to collapsing the actual power rail 6 toward the RD non-neutral node 42 of FIG. 2.

After steps 124 or 126, at step 128, it is determined whether the node number returned by either of functions 124 or 126 is already an existing power node by testing the return signal from function power_rail_srch( ). If so, then, at step 130, the variables plnk and flnk are compared. Otherwise, if a new power node is added to array power_rail[ ] by functions 124 or 126, then, at step 132, index variable end is incremented, which is followed by execution of step 130. If the test of step 130 is met, then, at step 134, *flnk is set equal to *nlnk. This effectively "de-links" the FD from linked lists LL0[ ] and LL1[ ]. The FD is de-linked when it has been evaluated and, hence, the power node has been collapsed through it.

Step 136 determines whether logical variable oside is true. If true, then, at step 138, variable plnk is adjusted (i.e., plnk=&LL0[*tlnk] or, in other words, the "previous" link pointer plnk is made equal to the "this" link pointer tlnk) followed by the adjustment of variable tlnk (i.e., tlnk=&LL1 [*tlnk]) and, then, step 140 is executed. For example, if tlnk contains the pointer to the memory address of LL0[0] (e.g., 80H), then from Table II, LL0[0] =0 (i.e., *tlnk equals the contents of memory address 80H=0), plnk is adjusted to contain the memory address of LL0[0] or 80H, and then tlnk is adjusted to contain the memory address of LL1[0]. Otherwise, if variable oside is false, then, at step 142, variable tlnk is set as a function (i.e., tlnk=&LL0[*nlnk]) of linked list LL0 and variable nlnk before step 140 is executed. In other words, in step 142, variable tlnk is set to reference numbers of FIG. 5. For purpose of illustration, but not of limitation, the exemplary addresses of linked list elements LL0[0] and LL1[0] are 80H and 90H, respectively. Also, variableflnk is 80H and variable link is 83H. For convenience of reference, variable changes are generally the only entries in the columns of Table IV.

TABLE IV

| Iter. No. | Address (hcx) of Elements of LL0[ ] | | | | | v_rec | ln | rn | power_rail[ ] | pr | srch | end | LL0[ ] | LL1[ ] | oside | Ref. No(s). |
|---|---|---|---|---|---|---|---|---|---|---|---|---|---|---|---|---|
| | flnk | plnk | tlnk | nlnk | llnk | | | | | | | | | | | |
| 1 | 80 | 80 | 80 | 90 | 83 | 1 | | 3 | 1 | 1 | 0 | 1 | 0,1,2,3 | 1,2,3,-1 | 0 | 108 |
| | | | | | | | 2 | | | | | | | | | 110 |
| | | | 81 | 91 | | 3 | | 4 | | | | | | | 1 | 152, 140 |
| | | | | | | | 2 | | | | | | | | | 110 |
| | | | 81 | 82 | 92 | 4 | | 3 | | | | | | | | 152,140 |
| | | | | | | | 1 | | | | | | | | | 110 |
| | | | | | | | | | 1,3 | | | | | | | 126 |
| | | | | | | | | | | | | 2 | | | | 132 |
| | | | 83 | 93 | | 5 | | 12 | | | | | 0,1,2,3 | 1,3,3,-1 | | 148,140 |
| 2 | | 80 | 80 | 90 | | 1 | | 3 | 1,3 | 3 | 1 | 2 | 0,1,2,3 | 1,3,3,-1 | 0 | 108 |
| | | | | | | | 2 | | | | | | | | | 110 |
| | | | | | | | | | 1,3,2 | | | | | | | 124 |
| | | | | | | | | | | | | 3 | | | | 132 |
| | | | | | | | | | | | | | 1,1,2,3 | | y | 134 |
| | | | 81 | 91 | | 3 | | 4 | | | | | | | 1 | 142,140 |
| | | | | | | | 2 | | | | | | | | | 110 |
| | | | 81 | 83 | 93 | 5 | | 12 | | | | | | | | 152,140 |
| 3 | | 80 | 81 | 93 | | 3 | | 4 | 1,3,2 | 2 | 2 | 3 | 1,1,2,3 | 1,3,3,-1 | 0 | 108 |
| | | | | | | | 2 | | | | | | | | | 110 |
| | | | | | | | | | | | | | | | | 122 | contain the memory address of LL0[*nlnk], wherein value *nlnk is read from the memory address contained in nlnk.

On the other hand, if variables plnk and flnk are not equal at step 130, then, at step 144, if variable plnk is less than variable flnk, then, at step 146, variable plnk is set equal to variable flnk, and *plnk is set equal to *nlnk, followed by execution at step 142. Otherwise, if variable plnk is not less than variable flnk, then, at step 148, variable dd is set as a function (i.e., dd=&LL0[*plnk]) of linked list LL0 and variable plnk, and *dd is set equal to *nlnk, before execution of step 142. For example, as shown in Table IV, step 148 is employed to update linked list LL1[ ] resulting in FD E1 of Table I being de-linked from array valid_recs[ ].

At step 140, after either step 138 or step 142, variable nlnk is set as a function (i.e., nlnk=&LL1[*tlnk]) of linked list LL1 and variable tlnk, variable v_rec (i.e., the FD being considered) is set as a function (i.e., v_rec=valid_rec[*tlnk]) of variable tlnk, variable rn is set as a function (i.e., rn=Field2[v_rec]) of variable v_rec, and logical variable oside is set true. Next, at step 150, if variable rn is equal to the node number of the neutral rail 8 of FIG. 2 (e.g., 12 in the exemplary embodiment), then variable k remains equal to 0 (i.e., as set by step 108), and function 98 returns with this result at step 122. Otherwise, execution resumes at step 110. At step 112, if both of variables rn or ln are not equal to variable pr, then, at step 152, variable plnk is set as a function (i.e., plnk=&LL0[*tlnk]) of linked list LL0 and variable tlnk, before execution of step 142. Step 152 acknowledges that the actual power rail cannot be collapsed through the FD pointed to by variable tlnk and is, consequently, not de-linked from array valid_recs[ ].

Operation of function 98 may be further understood by the following. Table IV, below, illustrates changes in the value of certain variables during the execution of function 98 for rung 62. The last column of Table IV refers to the For the exemplary rung 62 of FIG. 2, three iterations of function 98 are employed to resolve such rung. The first iteration searches for an FD element with node number one since index variable srch is 0. This FD element (i.e., contact 10e, labeled E1) is found from the third element (i.e., index=2) of array valid_recs[ ] (i.e., v_rec=4 as shown in Table III). The variable v_rec=4 is a record number (i.e., the index into arrays Field1[ ] and Field2[ ] of Table I). In turn, another element (i.e., 3) is added to array power_rail[ ] at index variable end=1 with execution of step 126. Consequently, the actual power rail has been collapsed through contact E1 to node 40 of FIG. 2. The value of such other element is the value of variable rn=3 when step 126 is executed. At step 132, index variable end is incremented to the next available entry into array power_rail[ ]. At the last entry of the first iteration, function 98 exits through steps 150,122 because variable rn is equal to 12. As shown in the LL1 [ ] column of Table IV, the second element of array valid_recs[ ] has been de-linked since the 2 in LL1[ ] has been changed to 3.

In Table IV, reading down the elements of LL0[ ] and LL1[ ] for the last entry of the first iteration:
(1) element 0 of array valid_recs[ ] as read from LL0[ ] is linked to element 1 of array valid-recsfl as read from LL1[ ];
(2) element 1 of array valid_recs[ ] as read from LL0[ ] is linked to element 3 of array valid_recs[ ] as read from LL1[ ]; and
(3) element 3 of array valid_recs[ ] as read from LL0[ ] is linked to the RD node (i.e., −1 at index three in LL1[ ]).

The second iteration of function 98 searches for an FD element with node number three since index variable srch=1. This FD element (i.e., contact 10b, labeled B1) is found from the first element of array valid_recs[ ](i.e., v_rec=1 as shown in Table III). In this case, variable rn is 3 (i.e., as shown in Table I; column Field2[ ], index 1) and variable ln is 2 (i.e., as shown in Table I; column Field1[ ]; index 1). This causes array power_rail[ ] to obtain another element (i.e., 2) at index variable end=2 through step 124. Thus, the array power_rail[ ] includes a list of the nodes 36,40,38 (i.e., 1,3,2). As before, index variable end is incremented to the next available entry into array power_rail[ ] at step 132. De-linking occurs at step 134 where the element at index 0 is replaced with 1 in LL0[ ]. Only two devices (i.e., contact 10d and coil 10f) remain linked. The power rail has been collapsed to node 38 of FIG. 2. At the last entry of the second iteration, function 98 exits through steps 150,122 because variable rn is equal to 12.

The third and final iteration of function 98 searches for an FD element with a node number two since index variable srch=2 and element power_rail[2] =2. Such FD element (i.e., contact 10d, labeled D1 in Table I) is found as the only FD element (i. e., the second element) which is not de-linked from array valid_recs[ ](i.e., v_rec=3 as shown in Table III; column rung 62; index 1). In this case, exit is through steps 118,120,122 because the value of variable rn is equal to RD node (i.e., 4 as shown in Table I; column Field2[ ]; index 3 and column Field1[ ]; index 5). Step 120 returns the variable k=1 for the RD element to be energized.

In turn, the RD element is to be energized through steps 91–92 of FIG. 3B. This is because node number two (i.e., node 38 of FIG. 2) is a pseudo power rail. The power rail 6 of FIG. 2, therefore, has been collapsed to node number two, and, since the FD element (i.e., contact 10d) at node number two is closed, the non-neutral node 42 of the RD element 10f is at the power rail potential. Hence, the power rail 6 has been collapsed to node number four (i.e., node 42 of FIG. 2) which is the left port of RD element 10f.

The exemplary apparatus 2 resolves ladder diagrams, without requiring special PLC ladder logic hardware, by employing only software as illustrated in the flowcharts of FIGS. 3A–3B and 4–5 for the processor 44 of FIG. 1. Furthermore, the ladder diagrams may include one or more rungs having FD elements with reverse power flow.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A logic controller apparatus for solving ladder logic, said ladder logic including a ladder rung having including a power rail, a neutral rail, and a plurality of devices organized in a plurality of rows, with the rows being in said ladder rung and including at least one of the devices and with the devices having two ports, with power from said power rail to said neutral rail flowing from the left port to the right port of at least one of the devices, and with power flowing from the second port to the first port of at least another one of the devices in at least one of said rows, said apparatus comprising:

means for storing representations of said ladder logic;

means for storing a plurality of digital logic signals; and     means employing at least some of the digital logic signals for solving said representations of said ladder logic independent of power flow direction in said at least one of said rows.

2. The apparatus as recited in claim 1 wherein power flow from the left port to the right port of said at least one of the devices being in a first direction between said power rail and said neutral rail, power flow from the right port to the left port of said at least another one of the devices being in a second direction between said power rail and said neutral rail, said second direction being different than said first direction, and said means employing at least some of the digital logic signals solving said representations of said ladder logic independent of said first and second directions.

3. A logic controller apparatus for solving ladder logic including a power rail, a neutral rail, and a plurality of devices organized in a plurality of rows, with the rows including at least one of the devices and with the devices having two ports, said apparatus comprising:

means for storing representations of said ladder logic;

means for storing a plurality of digital logic signals; and     means employing at least some of the digital logic signals for solving said representations of said ladder logic independent of power flow direction within one of said rows, with a representation of power from said power rail to said neutral rail flowing from the first port to the second port of one of the devices in a first state of said at least some of the digital logic signals, and with a representation of said power flowing from the second port to the first port of said one of the devices in a second state of said at least some of the digital logic signals.

4. The apparatus as recited in claim 3 wherein power flow from the first port to the second port of said one of the devices in the first state of said at least some of the digital logic signals being in a first direction between said power rail and said neutral rail, power flow from the second port to the first port of said one of the devices in the second state of said at least some of the digital logic signals being in a second direction between said power rail and said neutral rail, said second direction being different than said first direction, and said means employing at least some of the digital logic signals solving said representations of said ladder logic independent of said first and second directions.

5. An apparatus for solving ladder logic including a first power rail, a second power rail, and a plurality of devices organized in a plurality of rows, with the rows including at least one of the devices and with the devices having two ports, said apparatus comprising:

input means for inputting first digital logic signals;

output means for outputting second digital logic signals;

means for storing the first and second digital logic signals;

means for storing representations of said ladder logic; and     processor means including:

means for moving the first digital logic signals from said input means to said means for storing the first and second digital logic signals,         means for moving the second digital logic signals from said means for storing the first and second digital logic signals to said output means, and         means employing at least some of the first and second digital logic signals for solving said representations of said ladder logic independent of power flow direction within one of said rows, with a representation of power from said first power rail to said second power rail flowing from the first port to the second port of at least one of the devices, and with a representation of said power flowing from the second port to the first port of at least another one of the devices.

6. The apparatus as recited in claim 5 wherein power flow from the first port to the second port of said at least one of the devices being in a first direction between said power rail and said neutral rail, power flow from the second port to the first port of said at least another one of the devices being in a second direction between said power rail and said neutral rail, said second direction being different than said first direction, and said means employing at least some of the first and second digital logic signals solving said representations of said ladder logic independent of said first and second directions.

7. An apparatus for solving ladder logic, said ladder logic including a first power rail, a plurality of functional devices, a results device, and a second power rail; the functional devices and the results device having a first port and a second port; the functional devices having an on state, in which the ports thereof are logically connected, and alternatively having an off state, in which the ports thereof are logically disconnected; the results device having an on state, in which power flows from the first port to the second port thereof, and alternatively having an off state, in which no power flows from the first port to the second port thereof; the first port of at least one of the functional devices connected to the first power rail; the second port of the results device connected to the second power rail; the functional devices interconnected between the first power rail and the first port of the results device; the interconnection of the first power rail, the ports of the functional devices and the first port of the results device defining a plurality of independent nodes; at least some of the ports of the functional devices being connected to one of the nodes; the first port of the results device being connected to one of the nodes; the on state of the functional devices logically connecting a pair of the nodes; said apparatus comprising:

means for storing a representation of said ladder logic;

means for determining each of the functional devices having the on state;

means for determining a list of some of the nodes which are logically interconnected with the first power rail by some of said functional devices having the on state, with a first node of said some of the nodes being logically connected with the first power rail by at least one of said functional devices having the on state, with a second node of said some of the nodes being logically connected with the first node by at least another one of said functional devices having the on state, with an Nth node of said some of the nodes being logically connected with an Mth node of said some of the nodes by at least another one of said functional devices having the on state, the Nth node being logically interconnected with the first power rail by at least some of said some of said functional devices having the on state, with power flowing in a row from the second port to the first port of said at least another one of said functional devices, and alternatively, with power flowing from said first power rail through another one of said functional devices having the on state to said second node and with power flowing in said row from the first port to the second port of said at least another one of said functional devices; and means for determining the on state of the results device in the event that the first port of the results device is logically connected with the Mth node by at least one of said functional devices having the on state and for determining the off state of the results device otherwise.

8. The apparatus as recited in claim 7 wherein said means for determining the list includes means for determining the off state of the results device in the event that none of said functional devices having the on state logically connect the node of the first power rail to any of the other nodes.

9. The apparatus as recited in claim 7 wherein said means for determining the list includes means for determining the off state of the results device in the event that none of said functional devices having the on state logically connect the node of the first port of the results device to any of the other nodes.

10. The apparatus as recited in claim 7 wherein said means for determining the list includes means for determining the off state of the results device in the event that none of said functional devices having the on state logically connect the node of the first power rail to any of the other nodes, and the node of the first port of the results device to any of the other nodes.

11. The apparatus as recited in claim 7 wherein said ladder logic includes a first functional device, a second functional device, a third functional device and a fourth functional device, with the second functional device connected at one of the nodes to one of the first and second ports of the third functional device, with the first functional device connected to the other of the first and the second ports of the third functional device, and with the fourth functional device connected to said other of the first and the second ports of the third functional device.

12. The apparatus as recited in claim 7 wherein the list of said means for determining the list includes the node of the first power rail.

13. The apparatus as recited in claim 7 wherein said means for determining the list includes, for each device of said each of the functional devices having the on state and the results device:

a first identifier associated with one of the nodes which is connected to the first port of said each device, and a second identifier associated with the other one of the nodes which is connected to the second port of said each device.

14. The apparatus as recited in claim 13 wherein the first port of the results device is logically connected to the Mth node by at least one of said functional devices having the on state; wherein the list of said means for determining the list is an array having said some of the nodes which are logically interconnected with the first power rail by some of said functional devices having the on state; and wherein the node connected to the first port of the results device is associated with the second identifier of said at least one of said functional devices having the on state.

15. The apparatus as recited in claim 13 wherein the list of said means for determining the list includes an array including said some of the nodes which are logically interconnected with the first power rail by some of said functional devices having the on state, the array including a last node of said some of the nodes which are logically interconnected with the first power rail by some of said functional devices having the on state, the last node corresponding to at least one of the functional devices having the on state; and wherein said means for determining the on state of the results device includes comparing means for comparing the last node with each of the first and second identifiers of some of the functional devices having the on state other than said some of said functional devices having the on state.

16. The apparatus as recited in claim 15 wherein said means for determining the on state of the results device includes means for determining the off state of the results device in the event that said comparing means determines that the last node is not equal to the first and second identifiers of said some of the functional devices having the on state other than said some of said functional devices having the on state.

17. The apparatus as recited in claim 7 wherein said functional devices and said results device are organized in a plurality of rows, with the rows including at least one of said functional devices and said results device, and said means for determining the on state of the results device in the event that the first port of the results device is logically connected with the Mth node by at least one of said functional devices having the on state and for determining the off state of the results device otherwise includes means for solving said representation of said ladder logic independent of power flow direction within one of said rows.

18. The apparatus as recited in claim 17 wherein power flow from the first port to the second port of said at least one of said functional devices being in a first direction between said power rail and said neutral rail, power flow from the second port to the first port of said at least another one of said functional devices being in a second direction between said power rail and said neutral rail, said second direction being different than said first direction, and said means for determining the on state of the results device in the event that the first port of the results device is logically connected with the Mth node by at least one of said functional devices having the on state and for determining the off state of the results device otherwise, determining said on and off states of the results device independent of said first and second directions.

* * * * *